UNITED STATES PATENT OFFICE.

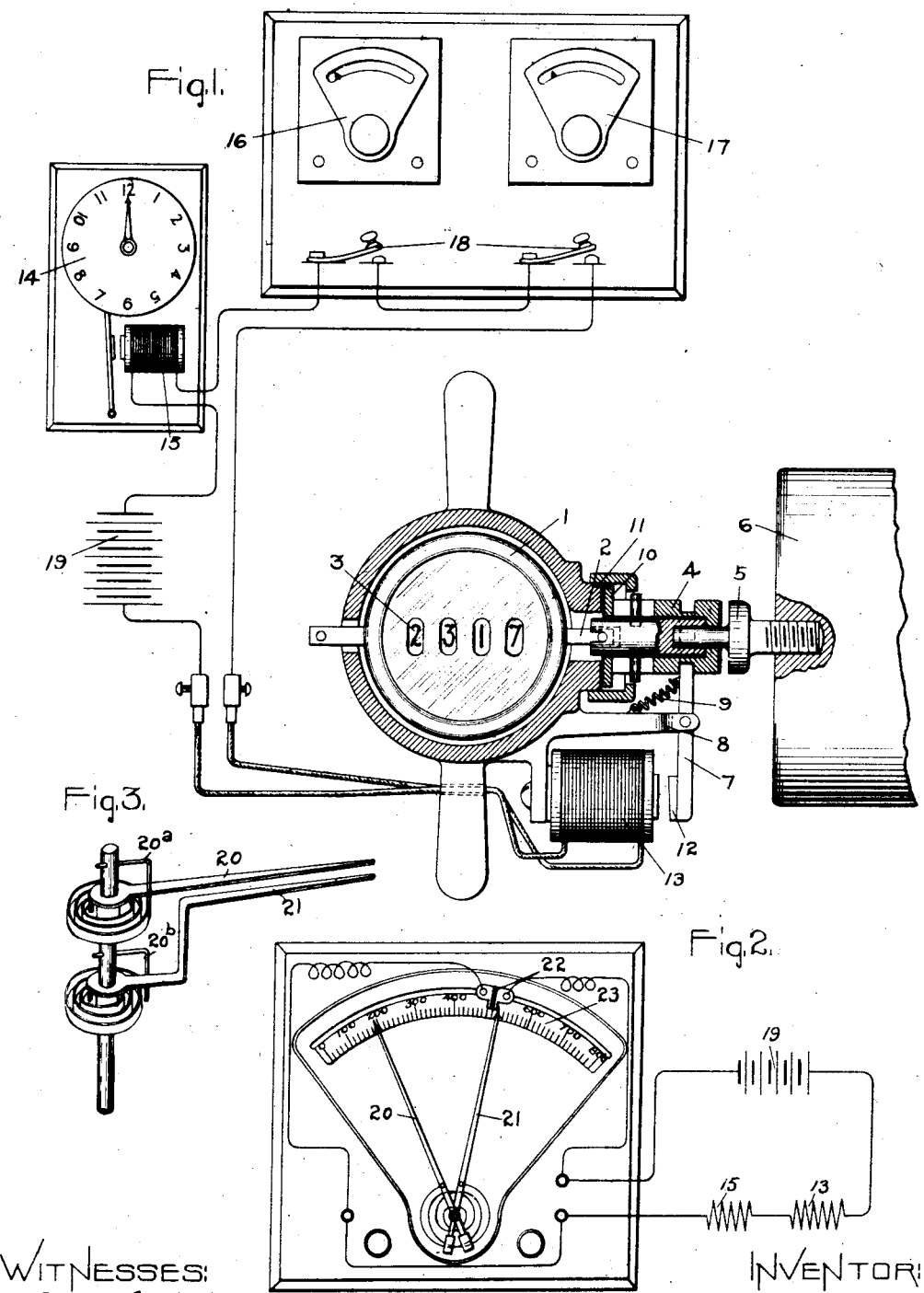

WALTER D. LITCHFIELD, OF SCHENECTADY, NEW YORK, ASSIGNOR TO GENERAL ELECTRIC COMPANY, A CORPORATION OF NEW YORK.

APPARATUS FOR MEASURING SPEED OF ROTATION.

No. 869,442.    Specification of Letters Patent.    Patented Oct. 29, 1907.

Application filed October 5, 1903. Serial No. 175,730.

*To all whom it may concern:*

Be it known that I, WALTER D. LITCHFIELD, a citizen of the United States, residing at Schenectady, in the county of Schenectady, State of New York, have invented certain new and useful Improvements in Apparatus for Measuring Speed of Rotation, of which the following is a specification.

This invention relates to apparatus for ascertaining the speed of rotation of shafts and the like and has especial reference to dynamo-electric apparatus. A common mode of doing this is by means of a rotation counter which registers the actual number of revolutions, and is held on the end of the shaft for some predetermined time, usually one minute. The difficulty here is in keeping the load, and consequently the speed, constant during the interval of test, and the object of my invention is to provide an organized system of devices which shall automatically insure that the rotation counter will operate only when the load and speed are at some given value. This is accomplished by connecting the rotation counter to the rotating part of the machine under test by means of an electromagnetic clutch in circuit with one or more switches located at the load-indicating instrument or instruments, and also in circuit with an electrically-controlled timing mechanism whereby one or more operators stationed at the load-indicating instrument or instruments can close the switch or switches at the instant when the load is of a predetermined value and thus cause the rotation counter and the timing mechanism to be simultaneously operated only at such time or times and for so long as the switch (or all of them if more than one is used) remains closed. At the end of the test, the total number of revolutions registered by the rotation counter divided by the number of seconds registered by the timing mechanism will give the exact speed at the predetermined load. The test may extend over several minutes, but the device will operate only during those portions of the time in which the load was at the given value and the switch or switches closed. The invention is therefore of especial advantage in running speed curves where the load varies considerably. The switch or switches may be closed automatically by the load-indicating instruments, if desired; but I prefer to have them worked by hand, as the automatic closure complicates the system and makes it more delicate to keep in order.

In the accompanying drawing, Figure 1 is a diagrammatic representation of my system; Fig. 2 shows an automatic circuit-closer; and Fig. 3 shows a detail of the automatic circuit-closer.

The rotation-counter 1 may be of any desired pattern in which the rotations of a spindle 2 are registered by a counting-train 3. Connected with the spindle is one member 4 of a clutch, the other clutch-member 5 being rigidly secured to the end of the shaft 6 or other rotating part of the machine whose speed is to be ascertained. The axes of the spindle and clutch-members are, of course, in line with the axis of the shaft. The clutch can be operated in any suitable way. I have shown a lever 7 fulcrumed in an arm 8 on the counter-frame. A spring 9 keeps the clutch-member 4 normally disengaged from the member 5 and causes a brake-collar 10 to press against a stationary face 11 on the frame of the rotation-counter. On the lever is the armature 12 of an electro-magnet 13, which when energized acts to close the clutch and thereby couple the rotation-counter to the shaft.

A suitable timing mechanism, such as a clock 14, is controlled in any desired manner by an electro-magnet 15, so that when said magnet is energized the clock is allowed to start, but is stopped again when the magnet is open-circuited.

At some convenient station or stations are arranged load-indicating instruments, such as a volt-meter 16 and ammeter 17. At each instrument is a push button or switch 18. A source of electric current, such as a battery 19, is connected with said switch or switches and, with the electro-magnets 13, 15, the parts being preferably arranged in series.

The operation is as follows: The observer at each station closes the circuit by means of his switch 18 whenever and as long as his instrument shows the proper reading. There will therefore be a complete circuit only when all the instruments give the correct indication, and when this occurs the electromagnets will be energized, clutching the rotation counter to the rotating shaft, and releasing the timing mechanism. When the circuit is broken by any one of the observers, the clutch flies open and the brake-collar 10, acting on the face 11, instantly stops the rotation counter. Simultaneously, the clock is arrested. At the termination of the run, the total number of revolutions counted, divided by the number of seconds measured off by the clock, gives the revolutions per second under the proper load.

It is possible to make the system entirely automatic, by using instruments which will operate also as circuit-closers when they indicate the proper load. Such an instrument is shown in Figs. 2 and 3, which illustrate a voltmeter or ammeter having two needles 20, 21 mounted on the arbor which carries the movable element. These needles are pressed by light springs, as indicated in Fig. 3, in opposite directions so as to be brought to rest in a normal condition against two stops 20$^a$, 20$^b$ carried by the arbor. Mounted in a slot on the voltmeter or wattmeter scale is a slide 22 composed of two sections insulated from one another, but movable as a unit in the slot. The sections have tongues which lie in the path of the needles 20, 21, and when the slide is shifted to any given point of desired load both needles will bear against the opposite protruding tongue so long as that load is maintained. When in this condition the circuit is completed through the clutch magnet 13, the two sections of the slide forming terminals of the clutch circuit. Thus so long as the needles bear on the tongues this circuit will be closed through the shaft on which the needles are mounted, but on either a decline or increase of load one or the other needle will be shifted away from the tongue with which it engages, thereby opening the circuit and disconnecting the counter.

In accordance with the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:

1. Apparatus for measuring speed of rotation comprising a rotation-counter, timing mechanism, electromagnetically-operated mechanism for simultaneously starting and stopping said counter and timing mechanism, and a plurality of switches arranged in series for controlling said mechanism.

2. Apparatus for measuring the speed of a rotating element, comprising a rotation-counter, an electromagnetic clutch for connecting said counter with said rotating element, timing mechanism, an electromagnetic releasing and stopping device therefor, and a switch for simultaneously closing and opening a circuit through said electromagnetic devices.

3. Apparatus for measuring the speed of a rotating element, comprising a rotation-counter, an electromagnetic clutch for connecting said counter with said rotating element, timing mechanism, an electromagnetic releasing and stopping device therefor, and a plurality of switches in series with said electromagnetic devices.

4. Apparatus for measuring speed of rotation under constant load, comprising one or more load-indicating instruments, a rotation-counter, timing mechanism, electrical devices for simultaneously starting and stopping said rotation-counter and said timing mechanism, and a switch at each load-indicating instrument for controlling said devices.

5. Apparatus for measuring speed of rotation under constant load, comprising a rotation-counter, timing mechanism, electrical means for simultaneously starting and stopping the same, and one or more load-indicating devices controlling the circuit of said means.

6. Apparatus for measuring speed of rotation under constant load, comprising a rotation-counter, timing mechanism, electrical means for simultaneously starting and stopping the same, one or more load-indicating devices, and a circuit-closer controlled by each device and in series with said electrical means.

In witness whereof, I have hereunto set my hand this third day of October, 1903.

WALTER D. LITCHFIELD.

Witnesses:
EDWARD WILLIAMS, Jr.,
HELEN ORFORD.